(12) United States Patent
Bawadhankar et al.

(10) Patent No.: US 11,847,703 B2
(45) Date of Patent: *Dec. 19, 2023

(54) COUPON BLENDING OF A SWAP PORTFOLIO

(71) Applicant: Chicago Mercantile Exchange Inc., Chicago, IL (US)

(72) Inventors: Dhiraj Bawadhankar, Aurora, IL (US); Fateen Sharaby, Hoboken, NJ (US); Steve Dayon, Huntley, IL (US); Jack Callahan, Wilmette, IL (US)

(73) Assignee: Chicago Mercantile Exchange Inc., Chicago, IL (US)

(*) Notice: Subject to any disclaimer, the term of this patent is extended or adjusted under 35 U.S.C. 154(b) by 108 days.

This patent is subject to a terminal disclaimer.

(21) Appl. No.: 17/536,931

(22) Filed: Nov. 29, 2021

(65) Prior Publication Data

US 2022/0084125 A1 Mar. 17, 2022

Related U.S. Application Data

(63) Continuation of application No. 17/119,141, filed on Dec. 11, 2020, now Pat. No. 11,216,885, which is a continuation of application No. 16/842,227, filed on Apr. 7, 2020, now Pat. No. 10,896,467, which is a continuation of application No. 16/532,026, filed on Aug. 5, 2019, now Pat. No. 10,650,457, which is a
(Continued)

(51) Int. Cl.
*G06Q 40/06* (2012.01)

(52) U.S. Cl.
CPC .................... *G06Q 40/06* (2013.01)

(58) Field of Classification Search
USPC .......................................................... 705/44
See application file for complete search history.

(56) References Cited

U.S. PATENT DOCUMENTS 5,068,816 A 11/1991 Noetzel
5,274,813 A 12/1993 Itoh
(Continued)

FOREIGN PATENT DOCUMENTS

WO 2009070690 A1 6/2009

OTHER PUBLICATIONS

H. Chang and M. Chen, "Dependency of Constrained Clustering of Transaction Data on Known Data Distribution," The 9th IEEE International Conference on E-Commerce Technology, 2007, pp. 73-79 (Clustering) (Year: 2007).*
(Continued)

*Primary Examiner* — Chikaodinaka Ojiaku
(74) *Attorney, Agent, or Firm* — Lempia Summerfield Katz LLC

(57) ABSTRACT

Systems and methods for blending a plurality of swaps may include determining a fixed rate for use in blending a plurality of swaps, each of the plurality of swaps having matching economics and a different associated fixed rate. A computing device may determine a first remnant swap for blending fixed rate components of the plurality of swaps using the fixed rate. In some cases, the computing device may determine second remnant swap for blending floating rate components of the plurality of swaps based on the first remnant swap.

21 Claims, 10 Drawing Sheets

Related U.S. Application Data continuation of application No. 14/338,052, filed on Jul. 22, 2014, now Pat. No. 10,475,123.

(60) Provisional application No. 61/954,006, filed on Mar. 17, 2014.

(56) References Cited

U.S. PATENT DOCUMENTS

| | | | | |
|---|---|---|---|---|
| 5,644,727 | A | * | 7/1997 | Atkins ............... G07F 9/001 705/40 |
| 5,978,511 | A | | 11/1999 | Horiuchi |
| 6,064,985 | A | | 5/2000 | Anderson |
| 6,278,981 | B1 | * | 8/2001 | Dembo ............... G06Q 40/02 705/36 R |
| 6,282,520 | B1 | | 8/2001 | Schirripa |
| 6,304,858 | B1 | * | 10/2001 | Mosler ............ G06Q 30/0601 705/37 |
| 6,317,727 | B1 | * | 11/2001 | May ................... G06Q 40/03 705/36 R |
| 6,333,788 | B1 | | 12/2001 | Yamada |
| 6,385,249 | B1 | | 5/2002 | Kondo |
| 6,424,972 | B1 | | 7/2002 | Berger |
| 7,222,317 | B1 | | 5/2007 | Mathur |
| 7,236,952 | B1 | | 6/2007 | D, Zmura |
| 7,349,878 | B1 | | 3/2008 | Makivic |
| 7,430,539 | B2 | | 9/2008 | Glinberg |
| 7,509,275 | B2 | | 3/2009 | Glinberg |
| 7,580,876 | B1 | | 8/2009 | Phillips |
| 7,587,641 | B1 | | 9/2009 | Sloane |
| 7,734,538 | B2 | | 6/2010 | Bauerschmidt |
| 7,822,668 | B1 | | 10/2010 | Benda |
| 7,870,052 | B1 | * | 1/2011 | Goldberg ............ G06Q 40/03 705/36 R |
| 8,108,281 | B2 | | 1/2012 | Koblas |
| 8,165,942 | B1 | * | 4/2012 | Rordorf ............. G06Q 40/04 705/36 R |
| 8,301,537 | B1 | | 10/2012 | Rachev |
| 8,515,058 | B1 | * | 8/2013 | Gentry ............... H04L 9/008 380/28 |
| 8,660,943 | B1 | * | 2/2014 | Chirehdast ......... G06Q 40/03 705/38 |
| 8,805,735 | B1 | * | 8/2014 | Goldberg ........... G06Q 40/06 705/36 R |
| 8,862,560 | B1 | | 10/2014 | Wu |
| 8,898,080 | B1 | * | 11/2014 | Nolan ................ G06Q 40/04 705/37 |
| 9,396,131 | B1 | | 7/2016 | Dendry |
| 10,896,467 | B2 | * | 1/2021 | Bawadhankar ...... G06Q 40/06 |
| 2002/0002528 | A1 | | 1/2002 | Terada |
| 2002/0038272 | A1 | | 3/2002 | Menchero |
| 2002/0138386 | A1 | | 9/2002 | Maggioncalda |
| 2003/0036918 | A1 | | 2/2003 | Pintsov |
| 2003/0055777 | A1 | | 3/2003 | Ginsberg |
| 2003/0061577 | A1 | | 3/2003 | Saluja |
| 2003/0101026 | A1 | | 5/2003 | Rabinowitz |
| 2003/0236738 | A1 | * | 12/2003 | Lange ................ G06Q 40/04 705/37 |
| 2004/0111358 | A1 | * | 6/2004 | Lange ................ G07F 17/32 705/37 |
| 2004/0177023 | A1 | | 9/2004 | Krowas |
| 2004/0186804 | A1 | | 9/2004 | Chakraborty |
| 2004/0199448 | A1 | | 10/2004 | Chalermkraivuth |
| 2004/0205457 | A1 | | 10/2004 | Bent |
| 2004/0220870 | A1 | * | 11/2004 | Lundberg ........... G06Q 40/04 705/37 |
| 2005/0050372 | A1 | | 3/2005 | Hagiwara |
| 2005/0055301 | A1 | | 3/2005 | Cohen |
| 2005/0096950 | A1 | | 5/2005 | Caplan |
| 2005/0144104 | A1 | * | 6/2005 | Kastel ............... G06Q 40/06 705/35 |
| 2006/0059067 | A1 | | 3/2006 | Glinberg |
| 2006/0112049 | A1 | | 5/2006 | Mehrotra |
| 2006/0224494 | A1 | * | 10/2006 | Pinkava ............. G06Q 40/04 705/37 |
| 2006/0259378 | A1 | | 11/2006 | Fornasari |
| 2007/0033123 | A1 | | 2/2007 | Navin |
| 2007/0083586 | A1 | | 4/2007 | Luo |
| 2007/0156555 | A1 | * | 7/2007 | Orr ................... G06Q 10/04 705/35 |
| 2007/0186206 | A1 | | 8/2007 | Abrams |
| 2007/0198387 | A1 | | 8/2007 | Uenohara |
| 2007/0244785 | A1 | | 10/2007 | Williams |
| 2007/0271204 | A1 | | 11/2007 | Jiang |
| 2007/0288351 | A1 | * | 12/2007 | Huntley ............. G06Q 40/04 705/37 |
| 2008/0120251 | A1 | | 5/2008 | Tyagi |
| 2008/0183615 | A1 | * | 7/2008 | Rio .................. G06Q 40/04 705/37 |
| 2008/0196076 | A1 | | 8/2008 | Shatz |
| 2008/0235061 | A1 | * | 9/2008 | Innes ................ G06Q 40/00 705/40 |
| 2008/0235172 | A1 | | 9/2008 | Rosenstein |
| 2008/0249956 | A1 | * | 10/2008 | Connors ............. G06Q 40/04 705/36 R |
| 2008/0249958 | A1 | * | 10/2008 | Anguish ............. G06Q 40/04 705/37 |
| 2008/0294571 | A1 | * | 11/2008 | Maloney ............ G06Q 40/06 705/36 R |
| 2008/0319920 | A1 | | 12/2008 | Levin |
| 2009/0138536 | A1 | | 5/2009 | Chao |
| 2009/0171826 | A1 | * | 7/2009 | Hadi ................. G06Q 40/00 705/35 |
| 2009/0216824 | A1 | | 8/2009 | Weinberg |
| 2009/0248564 | A1 | * | 10/2009 | Fallon ............... G06Q 40/04 705/37 |
| 2009/0265284 | A1 | | 10/2009 | Rowell |
| 2009/0281956 | A1 | | 11/2009 | An |
| 2009/0299910 | A1 | | 12/2009 | Khuong-Huu |
| 2009/0307124 | A1 | * | 12/2009 | Meyerhoff, II ...... G06Q 40/04 705/37 |
| 2010/0023457 | A1 | * | 1/2010 | Riviere ............. G06Q 40/04 705/36 R |
| 2010/0106633 | A1 | * | 4/2010 | Iyer ................. G06Q 40/03 705/35 |
| 2010/0138362 | A1 | * | 6/2010 | Whitehurst .......... G06Q 40/04 705/37 |
| 2010/0145841 | A1 | * | 6/2010 | Iyer ................. G06Q 40/04 705/37 |
| 2010/0145875 | A1 | * | 6/2010 | Schmid ............. G06Q 40/06 705/36 R |
| 2010/0259204 | A1 | | 10/2010 | Imura |
| 2010/0280970 | A1 | | 11/2010 | Lai |
| 2010/0281086 | A1 | | 11/2010 | Ganai |
| 2010/0323350 | A1 | | 12/2010 | Gordon |
| 2010/0328530 | A1 | | 12/2010 | Hashimoto |
| 2011/0004568 | A1 | * | 1/2011 | Phillips ............. G06Q 40/06 705/36 R |
| 2011/0035342 | A1 | | 2/2011 | Koblas |
| 2011/0060603 | A1 | | 3/2011 | Capelli |
| 2011/0153521 | A1 | * | 6/2011 | Green ............... G06Q 40/06 705/36 R |
| 2011/0161244 | A1 | * | 6/2011 | Iyer ................. G06Q 40/04 705/37 |
| 2011/0221489 | A1 | | 9/2011 | Tarng |
| 2012/0084177 | A1 | * | 4/2012 | Tanaka ............. G06Q 30/0601 705/26.1 |
| 2012/0190386 | A1 | * | 7/2012 | Anderson ........... G01S 19/14 455/456.3 |
| 2012/0296793 | A1 | * | 11/2012 | Wilson, Jr. .......... G06Q 40/04 705/37 |
| 2013/0018769 | A1 | | 1/2013 | Boudreault |
| 2013/0018818 | A1 | | 1/2013 | Yadav |
| 2013/0036074 | A1 | * | 2/2013 | Kaestel ............. G06Q 40/06 705/36 R |
| 2013/0041799 | A1 | * | 2/2013 | Nyhoff .............. G06Q 40/04 705/37 |

(56) References Cited

U.S. PATENT DOCUMENTS

| | | | |
|---|---|---|---|
| 2013/0041843 A1* | 2/2013 | Nyhoff | G06Q 40/06 705/36 R |
| 2013/0117197 A1 | 5/2013 | Shah | |
| 2013/0241933 A1 | 9/2013 | Thatcher | |
| 2013/0282554 A1 | 10/2013 | Boberski | |
| 2013/0339272 A1 | 12/2013 | Willism, III | |
| 2014/0023167 A1 | 1/2014 | Meyer | |
| 2014/0045702 A1* | 2/2014 | Letovsky | C12Q 1/6886 702/19 |
| 2014/0067650 A1* | 3/2014 | Gardiner | G06Q 40/03 705/38 |
| 2014/0244472 A1* | 8/2014 | Bauerschmidt | G06Q 20/381 705/37 |
| 2014/0258072 A1* | 9/2014 | Mayor | G06Q 40/06 705/37 |
| 2015/0032946 A1* | 1/2015 | Goss | H04L 9/0897 711/103 |
| 2015/0063374 A1* | 3/2015 | Venkatachalam Jayaraman | H04L 69/04 370/476 |
| 2015/0262305 A1* | 9/2015 | Bawadhankar | G06Q 40/06 705/36 R |
| 2015/0324914 A1* | 11/2015 | Zhan | G06Q 40/04 705/37 |
| 2015/0332383 A1* | 11/2015 | Ragan | G06Q 20/12 705/26.8 |
| 2015/0365619 A1 | 12/2015 | Mayer | |
| 2016/0012536 A1* | 1/2016 | Goyder | G06Q 40/06 705/36 R |
| 2016/0232105 A1* | 8/2016 | Goss | G06F 21/78 |
| 2016/0246266 A1 | 8/2016 | Kniazev | |
| 2016/0285571 A1 | 9/2016 | Badiu | |
| 2017/0061329 A1 | 3/2017 | Kobayashi | |
| 2018/0060958 A1* | 3/2018 | Gershon | G06Q 40/04 |
| 2018/0060959 A1* | 3/2018 | Gershon | G06Q 40/04 |
| 2020/0234374 A1* | 7/2020 | Bawadhankar | G06Q 40/06 |
| 2021/0304200 A1* | 9/2021 | Doney | H04L 9/0825 |

OTHER PUBLICATIONS

A. Abdelkhalek, A. Bilas and A. Michaelides, "Parallelization, optimization, and performance analysis of portfolio choice models," International Conference on Parallel Processing, 2001., Valencia, Spain, 2001, pp. 277-286 (Parallelization). (Year: 2001).*

Abdelkhalek et al., "Parallelization, Optimization, and Performance Analysis of Portfolio Choice Models", International Conference on Parallel Processing, 2001, pp. 277-286, Valencia, Spain.

EP Search Report in European Patent Application No. 15174114.7, dated Jun. 13, 2018, 7 pages.

ICAP, TriOptima and LCH.Clearnet Compression of Cleared Interest Rate Swaps Exceeds $100 trillion in Notional; $20.4 trillion Compressed in 2012 Alone, http://www.icap.com/news/2012/trioptima-swap-clear-usd100+trillion.aspx, 2 pages, Feb. 23, 2012.

International Search Report from International Application No. PCT/US2015/029941, dated Aug. 10, 2015, 2 pages.

ISDA, Interest Rate Swaps Compression: A Progress Report, ISDA Study, 9 pages, Feb. 2012.

Labuszewski et al., "Speculative Strategies with Treasury Options", CME Group, Nov. 11, 2013, 36 pages.

M. Bhide, K. Ramamritham and P. Shenoy, Efficiently maintaining stock portfolios up-to-date on the Web, Proceedings TwelfthInternational Workshop on Research Issues in Data Engineering: Engineering E-Commerce/E-Business Systems RIDE-2EC 2002,2002, pp. 60-65, (Stock Portfolio). (Year: 2002).

Mike Golio, Investment Instruments, in Engineering Your Retirement: Retirement Planning for Technology Professionals, IEEE, 2006, pp. 93-114, doi: 10.1002/9780470112472.ch5. (Investment). (Year: 2006).

Orcun Kaya, Deutsche Bank, Reforming OTC Derivatives Markets Observable Changes and Open Issues, 2013, Deutsche Bank AG, DB Research, 24 pages, Aug. 7, 2013.

Risk Management—Portfolio Compression for Outstanding Interest Rate Swap Trades, https://www.ccilindia.com/RiskManagement/Pages/Portfoliocompression.aspx, 2014, Developed by NSE-IT and maintained by CCIL-IT, 1 page, May 6, 2014.

* cited by examiner

| | Fixed Rate | Notional | Weighted Notional | | 91 | 182 | 271 | 364 |
|---|---|---|---|---|---|---|---|---|
| Swap 1 | 3 | -100000000.00 | -300000000.00 | $ | (758,333.33) | (758,333.33) | (741,666.67) | (775,000.00) |
| Swap 2 | 3.5 | 99000000.00 | 346500000.00 | $ | 875,875.00 | 875,875.00 | 856,625.00 | 895,125.00 |
| Swap 3 | 3.1 | -12000000.00 | -37200000.00 | $ | (9,403.33) | (9,403.33) | (9,196.67) | (9,620.00) |
| Swap 4 | 2.9 | 15600000.00 | 45240000.00 | $ | 114,356.67 | 114,356.67 | 111,843.33 | 116,870.00 |
| Swap 5 | 3.101 | 30000000.00 | 93030000.00 | $ | 235,159.17 | 235,159.17 | 229,990.83 | 240,327.50 |
| Swap 6 | 3.2 | 16500000.00 | 52800000.00 | $ | 133,466.67 | 133,466.67 | 130,533.33 | 136,400.00 |
| Swap 7 | 2.9545 | 33470000.00 | 98887115.00 | $ | 249,964.65 | 249,964.65 | 244,470.92 | 255,458.38 |
| Swap 8 | 3.241 | 20000000.00 | 64820000.00 | $ | 163,850.56 | 163,850.56 | 160,249.44 | 167,451.67 |
| Swap 9 | 3.2254 | -1500000.00 | -4839100.00 | $ | (12,229.64) | (12,229.64) | (11,960.86) | (12,498.43) |
| Swap 10 | 3.4591 | 45000000.00 | 155659500.00 | $ | 393,472.63 | 393,472.63 | 384,824.88 | 402,120.38 |
| Swap 11 | 3.0125 | -17250000.00 | -51965625.00 | $ | (131,357.55) | (131,357.55) | (128,470.57) | (134,244.53) |
| Swap 12 | 3.225 | 16543210.00 | 53354122.30 | $ | 1,348,616.27 | 1,348,616.27 | 1,318,976.25 | 1,378,256.18 |
| Swap 13 | 2.1975 | -8754210.00 | -19237576.75 | $ | (486,278.13) | (486,278.13) | (475,590.70) | (496,965.56) |
| Swap 14 | 1.841 | -15521000.00 | -28574610.00 | $ | (722,291.29) | (722,291.29) | (706,416.76) | (738,165.83) |
| Swap 15 | 3.1478 | -38210000.00 | -120277438.00 | $ | (304,034.63) | (304,034.63) | (297,352.56) | (310,716.71) |
| | | | | $ | 1,090,833.68 | 1,090,833.68 | 1,066,859.32 | 1,114,808.05 |
| | | 246983000.00 | 431538599.75 | $ | 1,090,833.68 | 1,090,833.68 | 1,066,859.32 | 1,114,808.05 |
| | | | | | | | | Difference? |

320 Simple Average: 3.006986667
322 Rounded to 5 Decimal: 3.00703
323 Weighted Average Rate: 17.91359899236

311 → 321 → 325 → 326 327 330 → 335 336 354

340 →

| Swap 16 Changed Rate | | 143511340.1 | 431538599.75 | $ | 1,090,833.68 | 1,090,833.68 | 1,066,859.32 | 1,114,808.05 |
| Takes Care of the Fixed Cashflow | | | | | | | | Difference? |

341 342 345

360 →

| Swap 17 | 0 | -119471340.12 | | | | | | |

| 600 | Fixed Rate (620) | Notional (630) | Weighted Notional (640) |
|---|---|---|---|
| Swap 1 | 3.1224 | -100,000,000.00 | -312,240,000.00 |
| Swap 2 | 3.505 | 99,000,000.00 | 346,995,000.00 |
| Swap 3 | 1.8 | -1,200,000.00 | -2,160,000.00 |
| Swap 4 | 2.95 | 15,600,000.00 | 46,020,000.00 |
| Swap 5 | 2.988 | -30,000,000.00 | -89,640,000.00 |
| Swap 6 | 3.258 | 16,500,000.00 | 53,757,000.00 |
| Swap 7 | 2.9545 | 33,470,000.00 | 98,887,115.00 |
| Swap 8 | 3.248 | 20,000,000.00 | 64,960,000.00 |
| Swap 9 | 3.2254 | -1,500,000.00 | -4,838,100.00 |
| Swap 10 | 3.4591 | -45,000,000.00 | -155,659,500.00 |
| Simple Avg (625) | 3.051040000 | 6,870,000.00 | 46,081,515.00 |
| Rounded (5 places) (627) | 3.05104 | Net Notional (635) | Net Weighted Notional (645) |

| Swap | Rate | Notional | 91 | 182 | 271 | 364 | |
|---|---|---|---|---|---|---|---|
| T1 | 3.06104 | 15,103,543.38 | $ 116,483.83 | $ 116,483.83 | $ 113,923.75 | $ 119,043.91 | ←820 |

Fixed Coupon Cash Flows of Original Portfolio

| | Rate | Notional | 91 | 182 | 271 | 364 | |
|---|---|---|---|---|---|---|---|
| Swap 1 | 3.1224 | -100,000,000 | $ (789,273.33) | $ (789,273.33) | $(771,926.67) | $ (806,620.00) | |
| ... | ... | ... | ... | ... | ... | ... | |
| Swap 10 | 3.4591 | -45,000,000 | $ (393,472.63) | $ (393,472.63) | $(384,824.88) | $ (402,120.38) | |
| Sum of Portfolio | | | $ 116,483.83 | $ 116,483.83 | $ 113,923.75 | $ 119,043.91 | ←830 |

| Trade | Notional | |
|---|---|---|
| Remnant trade 1 | 15,103,543.38 | ← 807 |
| Remnant Trade 2 | -8,233,543.38 | ← 907 |
| Net Notional | 6,870,000.00 | ← 635 |

Figure 9

| | Fixed Rate | | Notional | | Weighted Notional |
|---|---|---|---|---|---|
| Swap 1 | 3.6452 | | 5,000,000 | | 18,226,000 |
| Swap 2 | 3.725 | | -200,000,000 | | -745,000,000 |
| Swap 3 | 3.7777 | | 55,000,000 | | 207,773,500 |
| Swap 4 | 3.8765 | | 309,130,000 | | 1,198,342,445 |
| Swap 5 | 3.950 | | -175,000,000 | | -691,250,000 |
| Swap 6 (T1) | 3.05104 | | 15,103,543.38 | | 46,081,515 |
| Swap 7 (T2) | 0 | Rounded to 5 Decimals | -8,233,543.38 | | 0 |
| Simple Average | 3.6709066667 | | | | |
| | 3.67091 | | Net Notional | | Net Weighted Notional |
| | | | 1,000,000.00 | | 34,173,459.99 |

- 1010: New swaps on Day 3
- 1020: Remnant Swaps from Day 1 Blending
- 1025, 1027, 1035, 1045

Fixed Coupon Cash Flows of Remnant T3 (1100)

| Swap | Rate | Notional | 91 | 182 | 274 | 364 |
|---|---|---|---|---|---|---|
| T3 | 3.67091 | 9,309,261.19 | $86,382.91 | $86,352.91 | $84,484.39 | $88,281.44 |

Fixed Coupon Cash Flows of Original Portfolio (1110)

| | Rate | Notional | 91 | 182 | 274 | 364 |
|---|---|---|---|---|---|---|
| Swap 1 | 3.6452 | 5,000,000 | $46,071.28 | $46,071.28 | $45,058.72 | $47,083.83 |
| ... | | | | | | |
| Swap 7 (T2) | 0 | -8,233,543.38 | $0 | $0 | $0 | $0 |
| Sum of Portfolio | | | $86,382.91 | $86,382.91 | $84,484.39 | $88,281.44 |

Figure 12

| Net Notional Needed | T3 Notional | T4 Notional Calculated |
|---|---|---|
| $1,000,000.00 | $9,309,261.19 | -$8,309,261.19 |

Figure 13

| Trade | Notional | Fixed Rate |
|---|---|---|
| Remnant Trade 3 | $9,309,261.19 | 3.67091 |
| Remnant Trade 4 | -$8,309,261.19 | 0 |

COUPON BLENDING OF A SWAP PORTFOLIO

CROSS REFERENCE TO RELATED APPLICATIONS

The present application is a continuation of U.S. application Ser. No. 17/119,141, filed Dec. 11, 2020 entitled "COUPON BLENDING OF A SWAP PORTFOLIO," now U.S. Pat. No. 11,216,885, which is a continuation of U.S. application Ser. No. 16/842,227, filed Apr. 7, 2020 entitled "COUPON BLENDING OF A SWAP PORTFOLIO," now U.S. Pat. No. 10,896,467, which is a continuation of U.S. application Ser. No. 16/532,026, filed Aug. 5, 2019 entitled "COUPON BLENDING OF A SWAP PORTFOLIO," now U.S. Pat. No. 10,650,457, which is a continuation of U.S. application Ser. No. 14/338,052, filed Jul. 22, 2014 entitled "COUPON BLENDING OF A SWAP PORTFOLIO," now U.S. Pat. No. 10,475,123, which claims priority to U.S. provisional patent application Ser. No. 61/954,006, filed Mar. 17, 2014, the entire disclosures of each of which are hereby incorporated by reference and relied upon.

BACKGROUND

Over-the-counter (OTC) products include financial instruments that are bought, sold, traded, exchanged, and/or swapped between counterparties. Many OTC derivatives exist to fill a wide range of needs for counterparties, including limiting or mitigating exposure to risks and/or maximizing cash flow. After an exchange of an OTC product, counterparties may expend resources managing the product for the duration of its life. Management may be complicated based on the number of exchanges and/or the specific terms of the contract.

An interest rate swap (IRS) is an example of a type of OTC product where the parties agree to exchange streams of future interest payments based on a specified principal or notional amount. Each stream may be referred to as a leg. Swaps are often used to hedge certain risks, for instance, interest rate risk. They can also be used for speculative purposes.

An example of a swap includes a plain fixed-to-floating, or "vanilla," interest rate swap. The vanilla swap includes an exchange of interest streams where one stream is based on a floating rate and the other interest stream is based on a fixed rate. In a vanilla swap, one party makes periodic interest payments to the other based on a variable interest rate. The variable rate may be linked to a periodically known or agreed upon rate for the term of the swap such as the London Interbank Offered Rate (LIBOR).

In return for the stream of payments based on the variable rate, the party may receive periodic interest payments based on a fixed rate. The payments are calculated over the notional amount. The first rate is called variable, because it is reset at the beginning of each interest calculation period to the then current reference rate, such as LIBOR published rate. The parties to an IRS swap generally utilize these exchanges to limit, or manage, exposure to fluctuations in interest rates, or to obtain lower interest rates than would otherwise be unobtainable.

Usually, at least one of the legs to a swap has a variable rate. The variable rate may be based on any agreed upon factors such as a reference rate, the total return of a swap, an economic statistic, etc. Other examples of swaps include total return swaps, and equity swaps.

The expiration or maturity of the future streams of payments may occur well into the future. Each party may have a book of existing and new IRSs having a variety of maturity dates. The parties may expend substantial resources tracking and managing their book of IRSs and other OTC products. In addition, for each IRS, the party maintains an element of risk that one of its counterparties will default on a payment.

Currently, financial institutions such as banks trade interest rate payments and/or interest rate swaps over the counter. Streams of future payments must be valued to determine a current market price. The market value of a swap is the sum of the difference between the net present value (NPV) of the future fixed cash flows and the floating rate and the price of the swap is determined based on the fixed rate. Because the fixed rate of a particular swap is determined based on the available fixed rate at the time the price is struck, the fixed rates associated with two different swaps will rarely be the same. As such, each swap that is struck causes a separate line item to be booked until an opposite swap with the same fixed rate is struck. As such, it would be desirable to provide a way to blend coupons for reducing notional amounts and/or line items (e.g., swaps) on a financial organization's books.

SUMMARY

Systems and methods are described for reducing notional amount and/or clearing line items associated with swaps that are on an organization's books. In some cases, a method for reducing a notional amount and/or clearing line items associated with a portfolio of swaps may include determining a rate for use in blending a plurality of swaps, each of the plurality of swaps having matching economics and a different associated fixed rate. The method may further include determining, by one or more computing devices, a first remnant (e.g., a coupon adjustment swap) for blending fixed rate components of the plurality of swaps using the determined rate and determining a second remnant swap (e.g., a float adjustment swap) for blending floating rate components of the plurality of swaps based on the coupon adjustment swap.

In some cases, a non-transitory computer-readable medium may contain computer-executable instructions, that when executed by a processor, may cause one or more computing devices to determine a rate for use in blending a plurality of swaps, each of the plurality of swaps having matching economics and a different associated fixed rate, determine a coupon adjustment swap for blending fixed rate components of the plurality of swaps using the determined rate, and determine a float adjustment swap for blending floating rate components of the plurality of swaps based on the coupon adjustment swap.

In some cases, a system for reducing notional amount and/or clearing line items associated with swaps that are on an organization's books may include a network and one or more computing devices. The one or more computing devices may include a processor and one or more non-transitory memory devices. The memory device may be configured to store instructions, that when executed by the processor, cause the one or more computing devices to determine a rate for use in blending a plurality of swaps, each of the plurality of swaps having matching economics and a different associated fixed rate, determine, using one or more computing devices, a coupon adjustment swap for blending fixed rate components of the plurality of swaps using the determined rate, determine a float adjustment swap for blending floating rate components of the plurality of swaps based on the coupon adjustment swap, and communicate, via the network, information about the coupon adjustment swap and the float adjustment swap to an institution associated with the plurality of swaps. In some cases, the system may further include a user interface for allowing a user to enter and/or view information about a portfolio of swaps. For example, the user interface may facilitate entry of a desired fixed rate for use in combining coupons of a plurality of swaps. In some cases, the user interface may facilitate user viewing of a result of the coupon blending process, such as by displaying a portfolio view prior to coupon blending, a portfolio view after coupon blending, and/or an indication of a reduced gross notional obligation resulting from the coupon blending process.

The details of these and other embodiments of the present invention are set forth in the accompanying drawings and the description below. Other features and advantages of the invention will be apparent from the description and drawings.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIG. 3 illustrates a data table illustrative of a method for blending coupons of a swap portfolio in accordance with an aspect the invention.

FIG. 6 shows a data table including information about an illustrative portfolio to be compressed in accordance with an aspect the invention.

FIGS. 8-13 illustrate data tables illustrative of a method for blending coupons of a swap portfolio in accordance with an aspect the invention.

DETAILED DESCRIPTION

Figure 1:
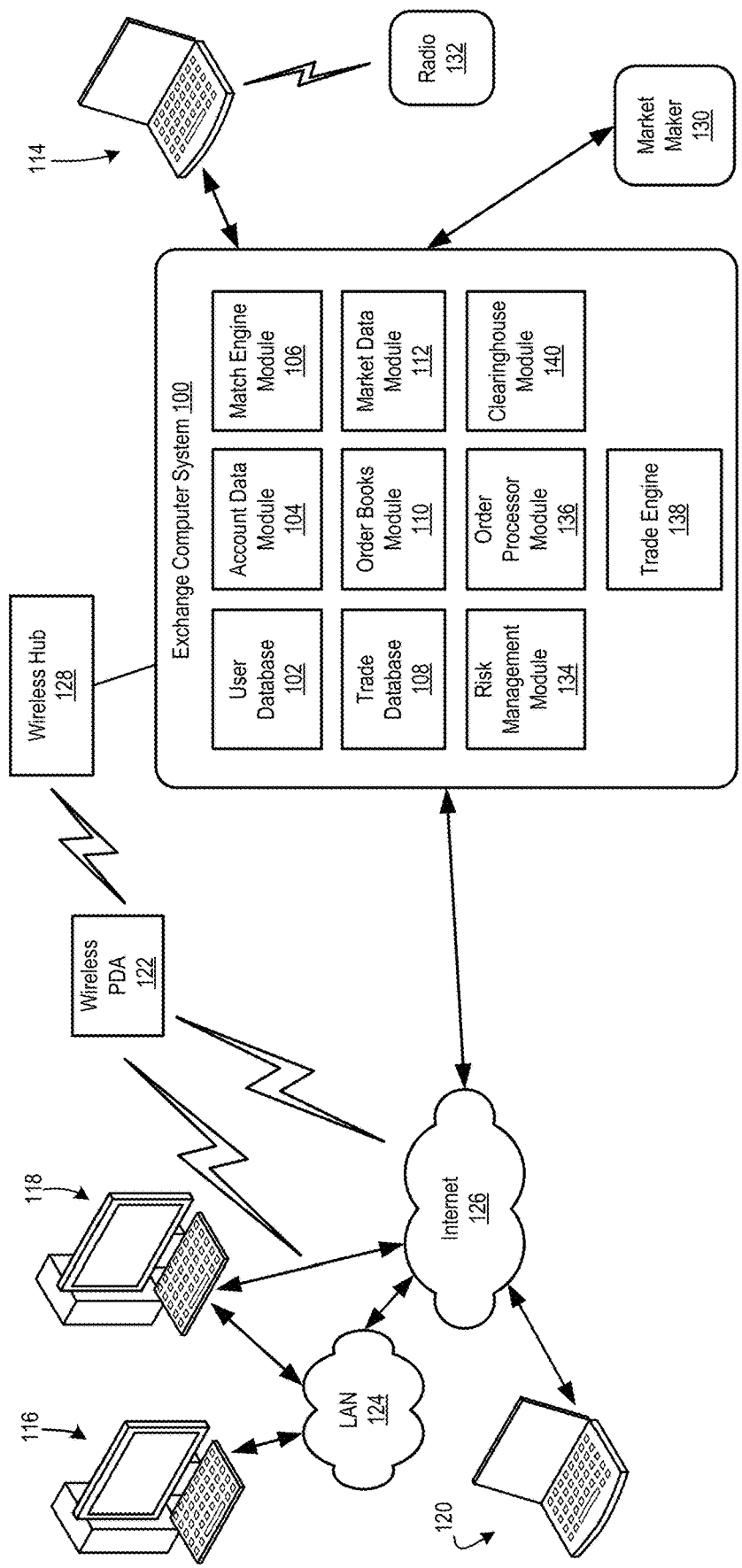
FIG. 1 shows an illustrative trading network environment for implementing trading systems and methods according to at least some embodiments.

In some cases, clients may desire to enter into one or more swaps (e.g., interest rate swaps) for hedging a position in a market. For example, an organization may have multiple positions in fixed rate mortgages, while having less exposure to products associated with a floating rate. At such times, the organization may desire to enter into one or more swaps with another party to hedge risks that may be associated with having a majority of fixed rate products. For example, when interest rates fall, the organization may make money by having a majority of fixed rate products in a portfolio. However, when the market goes up (e.g., interest rates rise), the organization may lose the opportunity to profit from the higher interest rates. By hedging these risks, the parties to the interest rate swaps may have a goal to allow their assets and/or liabilities to at least remain near the starting levels and/or minimize any losses. However, any gains that may be had during favorable market conditions may be limited by increasing the exposure to the floating point products.

Generally, an available fixed rate dictates the price of a swap, where the fixed rate changes over time. For example, a dealer may quote a swap at a first rate at a time (e.g., time 0). A short time later (e.g., about 10 minutes, about 30 minutes, etc.), the same dealer may provide a quote for a similar swap but having a second rate that is different than the first rate. Once the swaps are entered, the fixed rate will remain fixed for the lifetime of the swap. Over time, a swap purchaser (e.g., an individual, an organization, a business, etc.) may develop a portfolio of swaps, including the swaps of at least one pay swap (e.g., providing the fixed rate leg of the swap) and at least one receive swap (e.g., providing the floating rate leg of the swap). Few, if any, swaps may have the same interest rate resulting in a large number of swaps to remain open on the organization's books.

An organization or an individual may enter into multiple swaps during a given time frame (e.g., a day, a week, a month, etc.) and, as a result, may have multiple line items in their books in relation to these swaps. For example, a customer may have a first swap for paying a set amount (e.g., $100 million) and a second swap for receiving the same set amount (e.g., $100 million). Although these swaps are associated with the same notional amount, the interest rates are likely to be different. As such, these swaps will not net out. Rather, the $200 million remains open on the organization's books. These swaps may further be subject to regulatory requirements, such as governmental requirements, international banking requirements (e.g., BASEL 3 requirements), and/or the like. These regulatory requirements may, in turn, subject the organization to capital charges (e.g., a specified cash reserve) to ensure that a financial organization has enough cash to cover their liabilities regarding their swap portfolio.

In an illustrative example, a financial institution may have a house account having a number of swaps open in the account. Under the regulatory requirements, the financial institution is required to set aside capital (e.g., a margin account) to cover the open swaps. This cash requirement may be dependent upon, at least in part, on the gross notional amount associated with the swap portfolio. As such, the financial organization can reduce its capital requirements by reducing the number of line items on their books, and/or by reducing the gross notional of the swap portfolio.

In some cases, multiple line items having the same interest rate may be collapsed together (e.g., canceled). For example, a pay swap having an associated first notional amount of may be offset by a second notional amount associated with a receive swap when the pay and receive swaps have the same interest rate. However, this is rare. For example, a swap participant may use an investment strategy for achieving the same fixed rate for two or more different swaps. In such cases, the customer may specify a desired rate for a swap when contacting a dealer. While the dealer may be able to find a counter-party willing to enter into a swap at that rate, the swap may incur a fee to equalize the economics of the swap. For example, at the desired fixed rate, the economics of the swap may favor the paying party or the receiving party. By equalizing these differences, the swap may then be structured to allow the total value of the fixed rate leg to be equal to the floating rate leg of the swap.

In some cases, a clearinghouse may monitor a portfolio of swaps to determine whether any of the total notional value of the swap portfolio may be canceled or otherwise offset. For example, the clearinghouse may, on a periodic (e.g., daily) basis, process an algorithm to determine a net value of a client's swap portfolio and send a message to the client to terminate a line item, or offset at least a portion of the gross notional value when two or more line items may be collapsed.

In the past, the over-the-counter swap market was largely a bespoke market, where a customer desiring to enter into a swap would contact, such as by telephone, one or more dealers to determine which dealer would offer the best price to enter into the deal. In such cases, the swap may be entered on a common platform, but the trade execution was completed by phone. Because swaps may not be fully transparent, governmental regulations have required that swaps be executed via a Swap Execution Facility (SEF). A SEF is a regulated platform for swap trading that provides pre-trade information, such as bids, offers, and the like, and/or an execution mechanism to facilitate execution of swap transactions among eligible participants. Over time more and more types of swaps may be executed via a SEF, such as interest rate swaps. Because the SEF may operate using a more automated swap market mechanism, the likelihood that a customer may enter into different swaps, where each share a same interest rate will become increasingly rare. A SEF may execute many swaps with multiple coupons at a centralized location. In some cases, different swaps may share the same, or similar, economics to another swap. However, the coupons are likely to differ due to the swaps executing at different times. As such a client may quickly build a book (e.g., swap portfolio) with many swap line items, which, in turn, would require the client to incur a large capital obligation corresponding to the gross notional of the book of swaps.

Exemplary Operating Environment

Aspects of at least some embodiments can be implemented with computer systems and computer networks that allow users to communicate trading information. An exemplary trading network environment for implementing trading systems and methods according to at least some embodiments is shown in FIG. 1. The implemented trading systems and methods can include systems and methods, such as are described herein, that facilitate trading and other activities associated with financial products based on currency pairs.

A computer system, such as an exchange computer system 100, can be operated by a financial product exchange and configured to perform operations of the exchange for, e.g., trading and otherwise processing various financial products. Financial products of the exchange may include, without limitation, futures contracts, options on futures contracts ("futures contract options"), and other types of derivative contracts. Financial products traded or otherwise processed by the exchange may also include over-the-counter (OTC) products such as OTC forwards, OTC options, etc.

The exchange computer system 100 receives orders for financial products, matches orders to execute trades, transmits market data related to orders and trades to users, and performs other operations associated with a financial product exchange. The exchange computer system 100 may be implemented with one or more mainframe, desktop or other computers. In one embodiment, a computer device uses one or more 64-bit processors. A user database 102 includes information identifying traders and other users of the exchange computer system 100. Data may include user names and passwords. An account data module 104 may process account information that may be used during trades. A match engine module 106 is included to match prices and other parameters of bid and offer orders. Match engine module 106 may be implemented with software that executes one or more algorithms for matching bids and offers.

A trade database 108 may be included to store information identifying trades and descriptions of trades. In particular, a trade database may store information identifying the time that a trade took place and the contract price. An order book module 110 may be included to store prices and other data for bid and offer orders, and/or to compute (or otherwise determine) current bid and offer prices. A market data module 112 may be included to collect market data, e.g., data regarding current bids and offers for futures contracts, futures contract options and other derivative products. Module 112 may also prepare the collected market data for transmission to users. A risk management module 134 may be included to compute and determine a user's risk utilization in relation to the user's defined risk thresholds. An order processor module 136 may be included to decompose delta based and bulk order types for further processing by order book module 110 and match engine module 106.

A clearinghouse module 140 may be included as part of the exchange computer system 100 and configured to carry out clearinghouse operations. Module 140 may receive data from and/or transmit data to trade database 108 and/or other modules of the exchange computer system 100 regarding trades of futures contracts, futures contracts options, OTC options and contracts, and other financial products. Clearinghouse module 140 may facilitate the financial product exchange acting as one of the parties to every traded contract or other product. For example, the exchange computer system 100 may match an offer by party A to sell a financial product with a bid by party B to purchase a like financial product. Module 140 may then create a financial product between party A and the exchange and an offsetting second financial product between the exchange and party B. As another example, module 140 may maintain margin data with regard to clearing members and/or trading customers. As part of such margin-related operations, module 140 may store and maintain data regarding the values of various contracts and other instruments, determine mark-to-market and final settlement amounts, confirm receipt and/or payment of amounts due from margin accounts, confirm satisfaction of final settlement obligations (physical or cash), etc. As discussed in further detail below, module 140 may determine values for performance bonds associated with trading in products based on various types of currency pairs.

Each of the modules 102 through 140 could be separate software components executing within a single computer, separate hardware components (e.g., dedicated hardware devices) in a single computer, separate computers in a networked computer system, or any combination thereof (e.g., different computers in a networked system may execute software modules corresponding more than one of the modules 102-140).

Computer device 114 is shown directly connected to the exchange computer system 100. The exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to the exchange computer system 100.

Computer devices 116 and 118 are coupled to a LAN 124. LAN 124 may implement one or more of the well-known LAN topologies and may use a variety of different protocols, such as Ethernet. Computer devices 116 and 118 may communicate with each other and other computers and devices connected to LAN 124. Computers and other devices may be connected to LAN 124 via twisted pair wires, coaxial cable, fiber optics, radio links or other media.

A wireless personal digital assistant device (PDA) 122 may communicate with LAN 124 or the Internet 126 via radio waves. PDA 122 may also communicate with the exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet. Computers 116, 118 and 120 may communicate with each other via the Internet 126 and/or LAN 124.

One or more market makers 130 may maintain a market by providing constant bid and offer prices for a derivative or security to exchange computer system 100. The exchange computer system 100 may also include trade engine 138. Trade engine 138 may, e.g., receive incoming communications from various channel partners and route those communications to one or more other modules of the exchange computer system 100.

One skilled in the art will appreciate that numerous additional computers and systems may be coupled to the exchange computer system 100. Such computers and systems may include, without limitation, additional clearing systems (e.g., computer systems of clearing member firms), regulatory systems and fee systems.

The operations of computer devices and systems shown in FIG. 1 may be controlled by computer-executable instructions stored on non-transitory computer-readable media. For example, computer device 116 may include computer-executable instructions for receiving market data from the exchange computer system 100 and displaying that information to a user. As another example, clearinghouse module 140 and/or other modules of the exchange computer system 100 may include computer-executable instructions for performing operations associated with determining performance bond contributions associated with holdings in products that are based on various types of currency pairs.

Of course, numerous additional servers, computers, handheld devices, personal digital assistants, telephones and other devices may also be connected to the exchange computer system 100. Moreover, one skilled in the art will appreciate that the topology shown in FIG. 1 is merely an example and that the components shown in FIG. 1 may be connected by numerous alternative topologies.

Exemplary Embodiments

In some cases, the clearinghouse module 140 may be configured to monitor and/or otherwise manage a capital obligation associated with a plurality of swaps, such as a swap portfolio. In at least some embodiments, the exchange computer system 100 (or "system 100") receives, stores, generates and/or otherwise and processes data. In accordance with various aspects of the invention, a clearinghouse (e.g., the clearinghouse module 140) may act as a guarantor of the agreement for the derivative. As discussed above, a derivative (e.g., an over the counter swap) may be cleared and guaranteed by the clearinghouse. This may promise more interesting capital efficiencies to allow institutions to reduce a capital charge associated with a plurality of swaps, such as by reducing a gross notional and/or reducing line items associated with the plurality of swaps.

Figure 2:
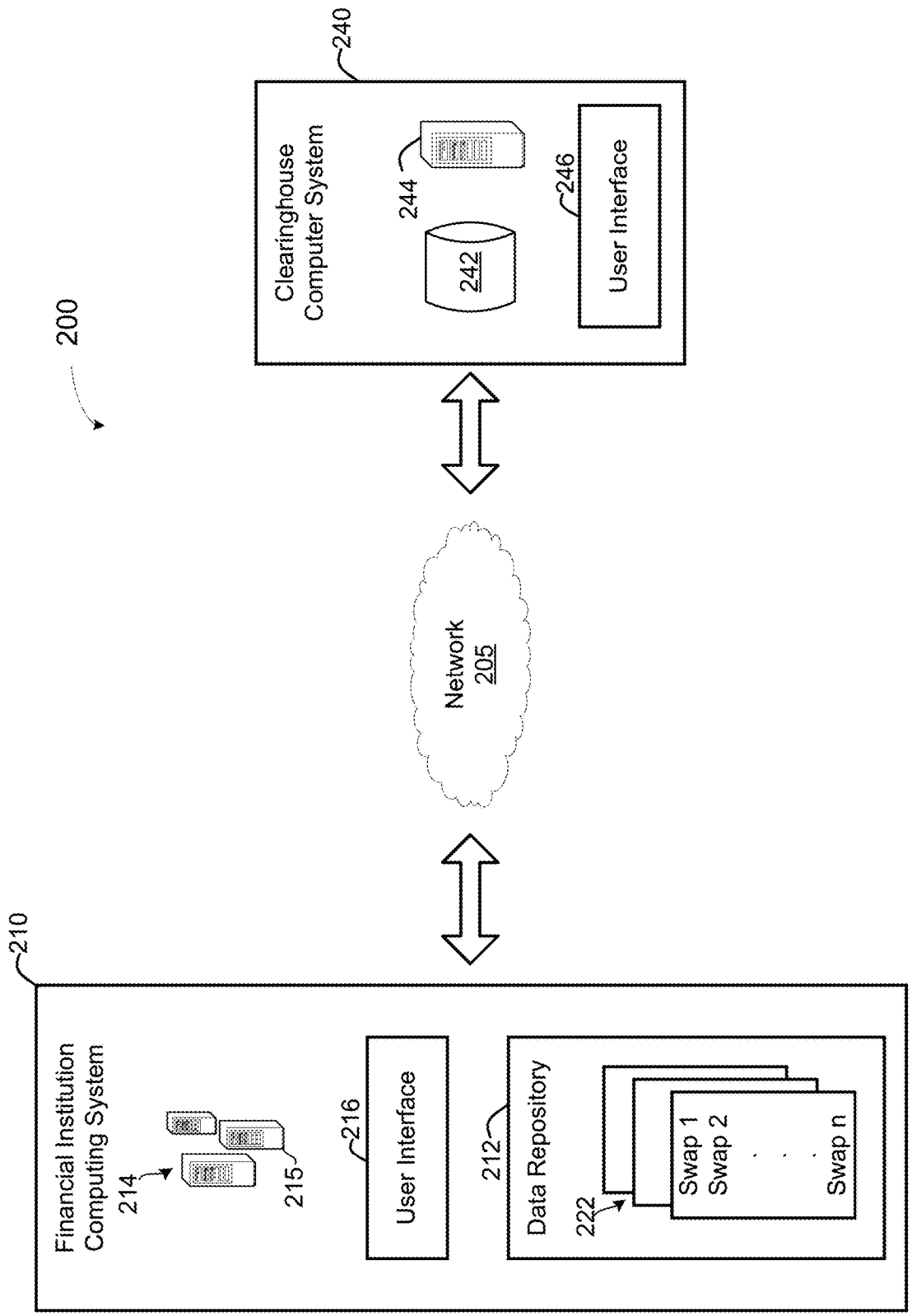
FIG. 2 shows a portion of an illustrative system for blending coupons associated with a plurality of swaps in accordance with an aspect of the invention.

FIG. 2 shows a portion of an illustrative system 200 for blending coupons associated with a plurality of swaps in accordance with an aspect of the invention. In some cases, the illustrative system 200 may include a financial institution computing system 210 communicatively coupled to a clearinghouse computer system 240 via a network 205 (e.g., a wide area network (WAN), the LAN 124, the Internet 126, etc.). The financial institution computing system 210 may include a data repository 212, one or more computing devices 214, and, in some cases, at least one user interface 216. In some cases, the data repository 212 may store information about one or more swap portfolios 222, where the swap portfolios may include information about two or more different swaps (e.g., swap 1, swap 2, swap n, etc.). For example, the swap information may include a fixed rate value, a floating rate value, a notional value, and/or a cash value for each of the plurality of different swaps of the swap portfolios 222. In some cases, the swap portfolios 222 may be associated with the financial institution, and/or one or more different customers of the financial institution. For example, a financial entity and/or a customer of the financial entity may desire to enter into one or more different swaps to hedge financial risk due to a plurality of fixed rate holdings and/or a plurality of floating rate holdings. In some cases, a computing device 215 and/or the user interface 216 may be used to facilitate user access to the one or more swap portfolios 222. For example, a user may log into the financial institution computing system 210 via one or more user interface screens accessible via the user interface 216. In some cases, the user interface 216 is at a geographical location local to the financial institution computer system 210 and/or at a geographical location of the user.

In some cases, the clearinghouse computer system 240 may include one or more of a data repository 242, a computing device 244 and/or a user interface 246. The clearinghouse computer system 240 may be communicatively coupled to at least one financial institution computer system, such as the financial institution computing system 210 via the network 205. In some cases, the clearinghouse computer system 240 may be configured to obtain information about one or more of the swap portfolios 222, process the information to blend coupons associated with the different swaps of the swap portfolios 222 and communicate information about the blended swaps to the financial institution computing system 210 to reduce one or more line items associated with the swap portfolios 222 and/or to reduce a gross notional value associated with the swap portfolios 222 to reduce a total capital charge incurred by the financial institution in relation to the swap portfolios 222.

FIG. 3 illustrates a data table 300 illustrative of a method for blending coupons of a swap portfolio by the clearinghouse computing system 240 in accordance with an aspect of the invention. The data table 300 includes information about a plurality of swaps 310 (e.g., the swap portfolios 222) held at the financial institution, a fixed rate 311, and a notional value 321 associated with each of the swaps 310. A weighted notional 325 may be calculated as a product of the fixed rate 311 and the notional value 321 for each of the swaps 310. The table may also include fixed cash flows 330 associated with each of the swaps 310, which may include one or more pay swaps and one or more receive swaps. The computing device 244 may be configured to compute an average rate 320 associated with the plurality of swaps 310. While the average may be calculated with high precision (e.g., greater than 5 decimal point precision), the market may only support a lesser degree of precision. As such the computing device 244 may round the average rate 320 to a rounded average rate 322 having a precision common to the financial industry (e.g., about five decimal point precision).

In blending the coupons of the swap portfolio 222, the computing device 244 may then be configured to calculate a gross notional sum 326 of the notional values 321 and a gross weighted notional sum 327 of the weighted notionals. A weighted average rate 323 may be calculated by dividing the gross weighted notional sum 327 of the weighted notionals by the gross notional sum 326 of the notionals. In some cases, the weighted average rate 323 may have a high precision (e.g., greater than five decimal places, about 11 decimal places, etc.) such that the cash flows 335 associated with the gross notional sum 326 and the gross weighted notional sum 327 are equal to the total cash flows 336 for the plurality of swaps 310 in the portfolio 222.

In some cases, to blend the coupons associated with the swaps 310 of a particular portfolio, a single blended swap may be constructed having the same financials as the sum of the swaps 310 in the portfolio 222. For example, a theoretical swap may be constructed having a notional equal to the gross notional sum 326 of the notionals of the swaps 310. In this case, the rate of the single blended swap may be found by dividing the gross weighted notional sum 327 of the weighted notionals 325 by the gross notional sum 326 of the notional values 321. To properly blend the swaps 310, the cash flows of the single blended swap must be equal to the total cash flows 336 of the swaps 310. In many cases, the resulting precision required for the coupon matching is much greater than (e.g., greater than about five decimal places, about 11 decimal places, and the like) the precision commonly supported in the financial industry. As such, methods discussed herein may be used to blend the coupons, combine line items, and/or reduce a gross notional value associated with the plurality of swaps 310 included in the swap portfolio 222.

In some cases, the coupons of the swaps 310 may be blended into two different swaps. A first remnant swap (e.g., a coupon adjustment swap) may be used for blending a component associated with the fixed rate portion of the plurality of swaps 310 and a second remnant swap (e.g., a float adjustment swap) may be used for blending a component associated with the floating rate portion of the swaps.

In some cases, the coupon adjustment swap may be determined as shown in table 340. In a first step, a rate may be determined (e.g., the rounded average rate 322 of the swaps 310, a user selected rate, a current market rate, a past market rate, etc.) for the coupon adjustment swap. Next, a weighted notional value is associated with the coupon adjustment swap. For example, because the coupon adjustment swap is desired to blend the swaps 310, the gross weighted notional sum 327 of the weighted notionals 325 of the swaps 310 is assigned as the weighted notional value of the coupon adjustment swap. Next, the notional value may be determined based on the rate 341 and the weighted notional of the coupon adjustment, such as by dividing the weighted notional value by the rate 341. However, to properly blend the fixed rate components of the swaps 310, the cash flows 345 of the coupon adjustment swap must match the total fixed cash flows values associated with the swaps 310. For example, the notional amount may be adjusted to keep the rate 341 at the proper value.

The float adjustment swap may be used to blend the float rate portion of the swaps 310. For example, the sum of the float payments for the float adjustment swap and the coupon adjustment swap will match the original trades. For example, the notional value 362 of the float adjustment swap may be computed by subtracting the notional 342 of the coupon adjustment swap from the total net notional, such as the gross notional sum 326. The rate 361 of the float adjustment swap may be set to zero because the coupon adjustment swap fully accounts for the fixed coupons of the swaps 310.

As can be seen, the plurality of swaps 310 has been reduced to two line items, the coupon adjustment swap, and the float adjustment swap, and the gross notional associated with the plurality of swaps has been reduced.

Figure 4:
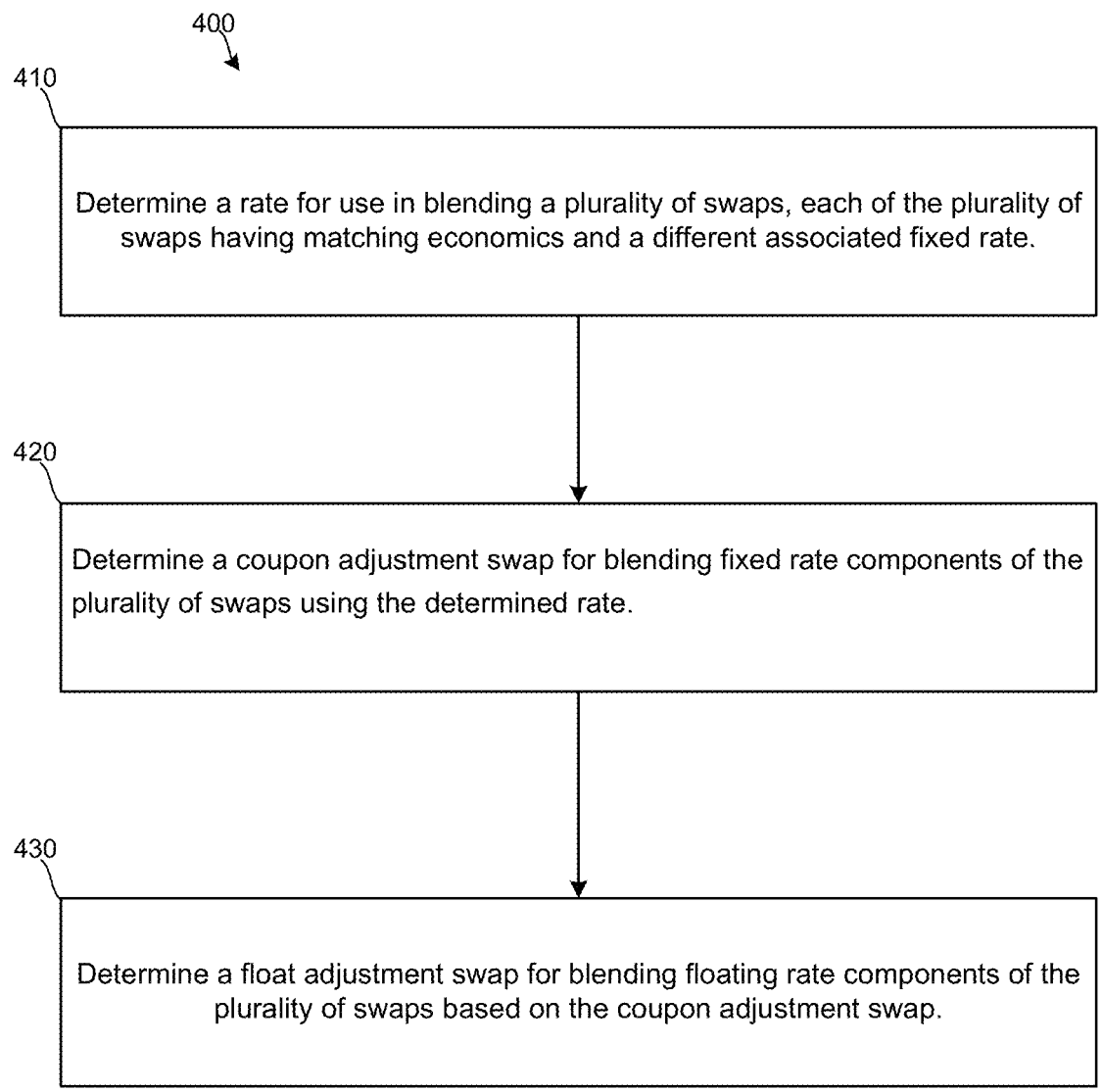
FIGS. 4 and 5 show illustrative flow diagrams for blending coupons associated with a plurality of swaps in accordance with an aspect the invention.
Figure 5:
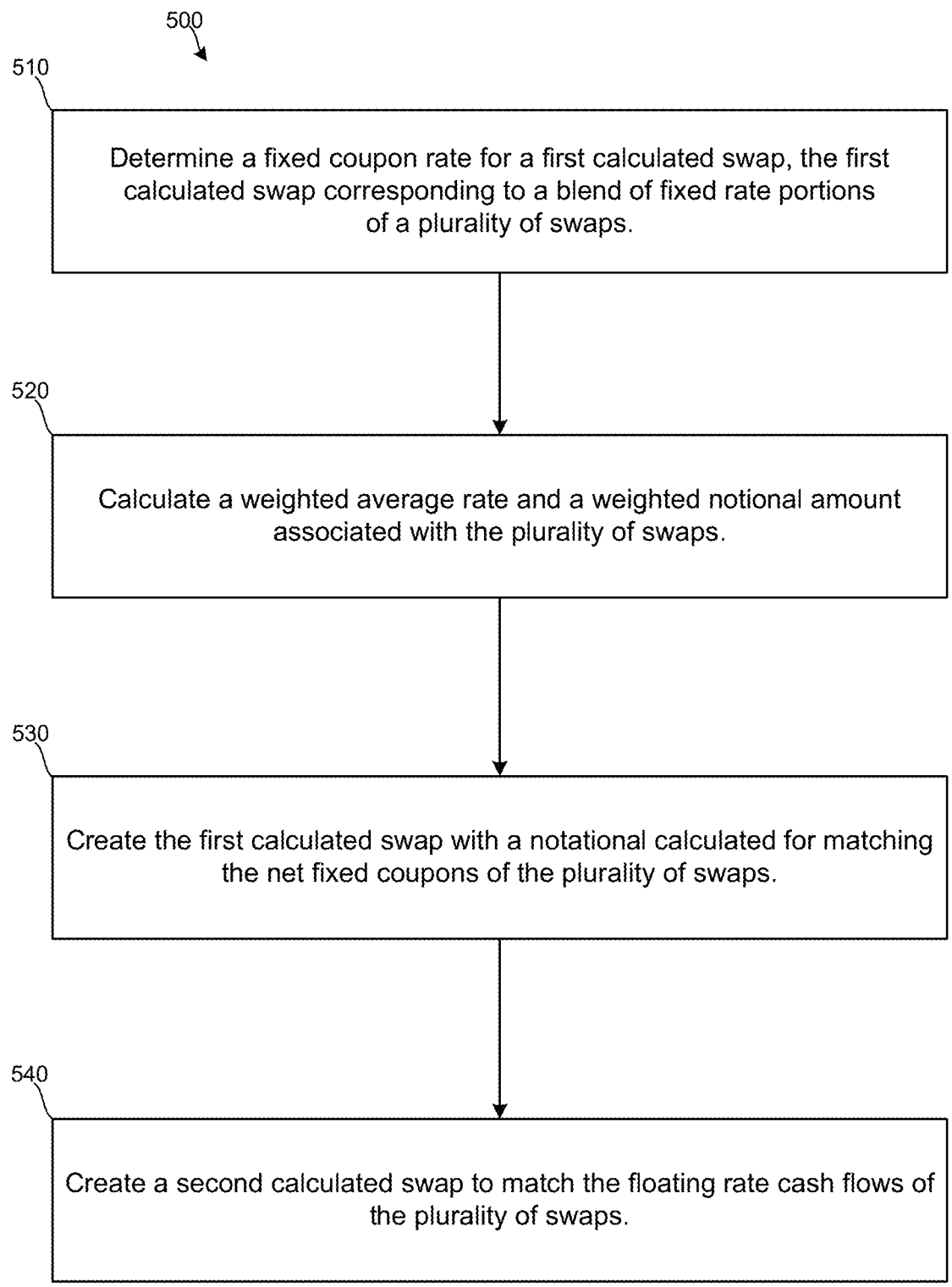

FIGS. 4 and 5 show illustrative flow diagrams 400, 500 for blending coupons associated with a plurality of swaps in accordance with an aspect the invention. For example, at step 410, a computing device (e.g., the computing device 244, the clearinghouse module 140, etc.) may determine a rate for use in blending a plurality of swaps (e.g., the swaps 310), each of the plurality of swaps 310 having matching economics and a different associated fixed rate. In some cases, the swaps include both pay swaps and receive swaps. At step 420, the computing device 244 may determine a coupon adjustment swap for blending fixed rate components of the plurality of swaps using the determined rate. At step 430, the computing device 244 may be configured to determine a float adjustment swap for blending floating rate components of the plurality of swaps based on the coupon adjustment swap.

In some cases, the rate of the coupon adjustment swap may be determined by calculating a rounded average rate (e.g., a simple average) of rates associated with each of the plurality of swaps. In other embodiments, the rate of the coupon adjustment swap may be determined by determining a rate corresponding to a currently quoted swap having matching economics to the plurality of swaps and/or receiving a user entered rate.

In some cases, the computer device may determine a weighted notional value associated with each of the plurality of swaps, wherein each weighted notional value for a particular swap is determined based on the fixed rate and a notional value associated with the particular swap. The notional value associated with the coupon adjustment swap may be determined using the rate and the gross weighted notional sum 327 of weighted notionals associated with the plurality of swaps such that a cash flow of the coupon adjustment swap may be equal to the sum of the fixed cash flows associated with the plurality of swaps.

In some cases, determining the float adjustment swap may comprise determining a zero fixed rate trade having a notional value of a difference between a gross notional sum 326 of notional values 321 of the plurality of swaps 310 and a notional value 342 of the coupon adjustment swap. The computing device 224 may be configured to obtain The plurality of swaps from a data repository of a financial institution, compare a count of the plurality of swaps to a criterion, and responsive to the count meeting the criterion, blending at least a portion of the plurality of swaps using the coupon adjustment swap and the float adjustment swap.

In some cases, the method 400 may include determining a total notional amount associated with a plurality of swaps having same economics, comparing the total notional amount to a criterion, and, responsive to the total notional amount meeting the criterion, blending at least a portion of the plurality of swaps 310 using the coupon adjustment swap and the float adjustment swap. In some cases, individual swaps of plurality of swaps to be blended may be selected by a user.

In some cases, the computing device 244 may blend at least a portion of the plurality of swaps 310 using the coupon adjustment swap and the float adjustment swap on a daily basis and communicate, via the network 205, information about the coupon adjustment swap and the float adjustment swap to a financial institution associated with the plurality of swaps 310. The computing device 224 may further communicate, via the network 205, information about at least the blended portion of the plurality of the swaps to the financial institution, wherein at least the information about the coupon adjustment swap and the float adjustment swap are to be used to meet a regulatory requirement.

The flow diagram 500 of FIG. 5 may allow a computing device 224 to blend two or more different swaps. As discussed above, coupon blending is a form of compression that may be used to reduce notional amounts and/or line items for trades that are economically equivalent except for their fixed rates. In some cases, a goal for market participants is to reduce capital requirements associated with a portfolio of swaps by reducing gross notional amounts and/or the number of line items associated with the swaps. Coupon blending may be accomplished using both pay swaps and receive swaps. A fixed rate associated with the blended coupon may be configured to lie within a range of rates associated with the different swaps included in the blended portfolio of swaps. Further, the blended coupon may be designed to reduce the number of line items associated with the swaps and/or reduce the gross notional corresponding to the portfolio of swaps. Also, the precision of the fixed rate for use in specifying the blended trade having the blended coupon may be chosen to be within a precision range commonly used in the marketplace. In some cases, the blended coupon and the associated blended trade may be represented by two netting options. In some cases, a number of swaps may automatically be blended. In some cases, a user may select one or more swaps to be included and/or one or more swaps to be excluded from inclusion in the blended trade. In some cases, when an account (e.g., a portfolio of swaps) is specified for blending, a standard netting option may be applied to the account before the calculating the coupon blending method of FIG. 4 or FIG. 5. For example, for swaps having a same interest rate, the notionals of these swaps may net out automatically.

At 510, the method may begin by determining a fixed coupon rate for a first calculated swap, where the first calculated swap corresponds to a blend of fixed rate portions of a plurality of swaps, such as the swaps 310. In some cases, a simple average of the fixed rates associated with the plurality of swaps may be calculated to determine the fixed rate of the first calculated swap. The determined rate may be rounded according to a specified decimal precision (e.g., 5 decimal places, etc.). This average rate may be used to assign a rate that is close to a market rate, an example is shown below in Table 1 and equation (1).

TABLE 1

Calculating an average rate for a swap portfolio

| Original Portfolio | Fixed Rate |
|---|---|
| Swap 1 | 3.1224 |
| Swap 2 | 3.505 |
| Swap 3 | 1.8 |
| Swap 4 | 2.95 |
| Swap 5 | 2.988 |
| Swap 6 | 3.258 |
| Swap 7 | 2.9545 |
| Swap 8 | 3.248 |
| Swap 9 | 3.2254 |
| Swap 10 | 3.4591 |
| Simple Average 3.051041000 | Rounded to 5 Decimals 3.05104 |

A simple average of the fixed rates of the swaps in the swap portfolio may be calculated using equation (1), where n is the number of rates included in the calculation.

$$\text{Simple Average} = (Rate_1 + Rate_2 + \ldots Rate_n) \div n \quad (1)$$

At 520, a weighted average rate and a weighted notional amount are calculated and associated with the plurality of swaps.

$$\text{Weighted Notional} = \text{Fixed Rate} * \text{Notional} \quad (2)$$

$$\text{Net Weighted Notional} =, \sum_{i=1}^{n} (\text{Weighted Notional})_i \quad (3)$$

$$\text{Weighted Average Rate} = (\text{Net Weighted Notional}) / (\text{Net Notional}) \quad (4)$$

TABLE 2

Determine Weighted Average Rate and Net Weighted Notional

| | Fixed Rate | Notional | Weighted Notional | |
|---|---|---|---|---|
| Swap 1 | 3.1224 | −100,000,000.00 | −312,240,000.00 | |
| Swap 2 | 3.505 | 99,000,000.00 | 346,995,000.00 | |
| Swap 3 | 1.8 | −1,200,000.00 | −2,160,000.00 | |
| Swap 4 | 2.95 | 15,600,000.00 | 46,020,000.00 | |
| Swap 5 | 2.988 | −30,000,000.00 | −89,640,000.00 | |
| Swap 6 | 3.258 | 16,500,000.00 | 53,757,000.00 | |
| Swap 7 | 2.9545 | 33,470,000.00 | 98,887,115.00 | |
| Swap 8 | 3.248 | 20,000,000.00 | 64,960,000.00 | |
| Swap 9 | 3.2254 | −1,500,000.00 | −4,838,100.00 | |
| Swap 10 | 3.4591 | 45,000,000.00 | −155,659,500.00 | |
| Simple Average 3.051041000 | Rounded to 5 Decimals 3.05104 | Net Notional 6,870,000.00 | Net Weighted Notional 46,081,515.00 | Weighted Average Rate 6.70764410480 |

At 530, the first calculated swap is created using a notational calculated for matching the net fixed coupons of the plurality of swaps included in the original portfolio. The weighted average rate may often be an off-market rate. As such, the notional for the first calculated swap may be adjusted to keep the rate at our simple average rate, chosen to be substantially similar to a current market rate, or set to a specified rate by a user. Once determined the Notional may be rounded to two decimal places. In creating the first calculated swap, the associated fixed coupon amounts will match the fixed coupon amounts paid on the original swap portfolio. This swap corresponds to the "Fixed" cash flow portion of the original swaps included in the swap portfolio.

$$\text{First Remnant Trade Notional} = \text{Net Weighted Notional} \div \text{Rounded Average Rate} \quad (5)$$

TABLE 3

Fixed Coupon Amounts match the Coupon Amount of the Original Portfolio:

| Net Weighted Notional | Simple Average | Notional | Fixed Coupon Amounts | | | |
|---|---|---|---|---|---|---|
| | | | 91 | 182 | 271 | 364 |
| 46,081,515.00 | 3.05104 | 15,103,543.38 | $116,483.83 | $116,483.83 | $113,923.75 | $119,043.91 |

TABLE 4

First Calculated Swap

| Weighted Average Rate | Net Notional | Fixed Coupons of Original Portfolio | | | |
|---|---|---|---|---|---|
| 6.70764410480 | 6,870,000.00 | 91 | 182 | 271 | 364 |
| | | $116,483.83 | $116,483.83 | $113,923.75 | $119,043.91 |
| | | Net Difference | | | |
| | | $ – | $ – | $ – | $– |

At 540, the second calculated swap is created to match the floating rate cash flows of the plurality of swaps. The sum of float payments of both the first calculated swap and the second calculated swap match the float payments associated with the swaps included in the original swap portfolio. The notional amount on calculated swap 2 is calculated as follows in equation (5)

$$\text{Second Remnant Trade Notional} = \text{Net Notional} - \text{First Remnant Trade Notional} \quad (6)$$

As the fixed coupon on calculated swap 1 fully accounts for the fixed coupons of the original trades, a fixed rate is not required on the second calculated swap. As such, the associated fixed rate is set to 0.

TABLE 5

Compute the Notional of the Second Calculated swap (CS2)

| Net Notional | CS1 Notional | CS2 Notional |
|---|---|---|
| 6,870,000 | 15,103,543.38 | –8,233,543.38 |

As can be seen, the line items of a 10 trade swap portfolio have been reduced to two calculated swaps. Further, all other economic details will match the trades in the original portfolio.

TABLE 6

Coupon Blended Swap Portfolio

| Trade | Notional | Fixed Rate |
|---|---|---|
| Calculated swap 1 | 15,103,543.38 | 3.05104 |
| Calculated swap 2 | –8,233,543.38 | 0 |

In some cases, a market participant may desire to combine (e.g., compress) one or more holdings in a portfolio, such as by blending coupons to reduce notional amounts and/or line items (e.g., swaps) on a financial organization's books. This compression may be used to reduce notional amounts and/or line items for pay-fixed cleared interest rate swaps, receive-fixed cleared interest rate swaps and/or a combination of pay-fixed and receive-fixed swaps. By compressing the holdings in the portfolio, additional cost efficiencies may be seen by having fewer transaction ticket charges when terminating or rolling outstanding residual positions. Further, such portfolio compression may lead to lower 3rd party costs for portfolio maintenance operations. Additionally, the compression process may utilize a specified rounding precision (e.g., greater than or equal to 2 decimal places, at least 5 decimal places) when compressing holdings of a portfolio. As such, the coupon blending process may utilize existing market standards and/or system infrastructure. In some cases, the pay-fixed and receive-fixed cleared interest rate swaps may have the same attributes but have different fixed rates and/or notional amounts. In some cases, the holdings in a portfolio may be compressed at the expiration of specified time intervals, such as at the end of a trading day, or at the end of a calendar day. For example, the compression may be performed daily, either manually or automatically, as part of an end of day work flow. In some cases, the compression may be performed on an ad-hoc basis.

FIG. 6 shows an illustrative portfolio 600 having a plurality of swaps, such as swaps 610, according to aspects of this disclosure. The swaps 610 of portfolio 600 may have the same, or substantially similar, attributes but different interest rates 620 and/or notional amounts 630 as illustrated in the fixed rate column and the notional amount column. In some cases, the rates associated with each of the swaps may have a different precision. For example, the rate (e.g., 3.1224) of swap 1 has a precision set at 4 decimal places, while the interest rate of swap 3 (e.g., 1.8) has a precision of 1 decimal place. In some cases, an average interest rate, such as the simple average rate 625, may be calculated based on the interest rates 620 associated with the swaps in the portfolio 600. In some cases, the simple average rate may be rounded to a specified precision (e.g., about 5 decimal places, etc.), such as the rounded average rate 627. In some cases, other methods may be used to find an interest rate, such as by computing a median value (e.g., 3.2254) of the interest rates 620 and/or a midrange value (e.g., 2.6525) of the interest rates 620. As mentioned above, the simple average rate 625 may be calculated to a precision greater than, or equal to, five decimal places. In this illustrative example, the simple average rate 625 is shown having a precision of 9 decimal places (e.g., 3.051040000). In some cases, the simple average rate may be rounded to a specified decimal place precision, such as the rounded average rate 627 having a precision of 5 decimal places (e.g., 3.05104).

In some cases, a weighted notional amount for each swap may be calculated, such as by multiplying the notional amount by a constant (e.g., the interest rate). These weighted notionals 640 may be used when blending the swaps of the portfolio 600. For example, the weighted notionals associated with the swaps in the portfolio may be summed to determine a net weighted notional 645 associated with the portfolio 600. Similarly, the notional amounts 630 associated with the swaps 610 may be summed to determine a net notional 635 associated with the portfolio.

Figure 7:
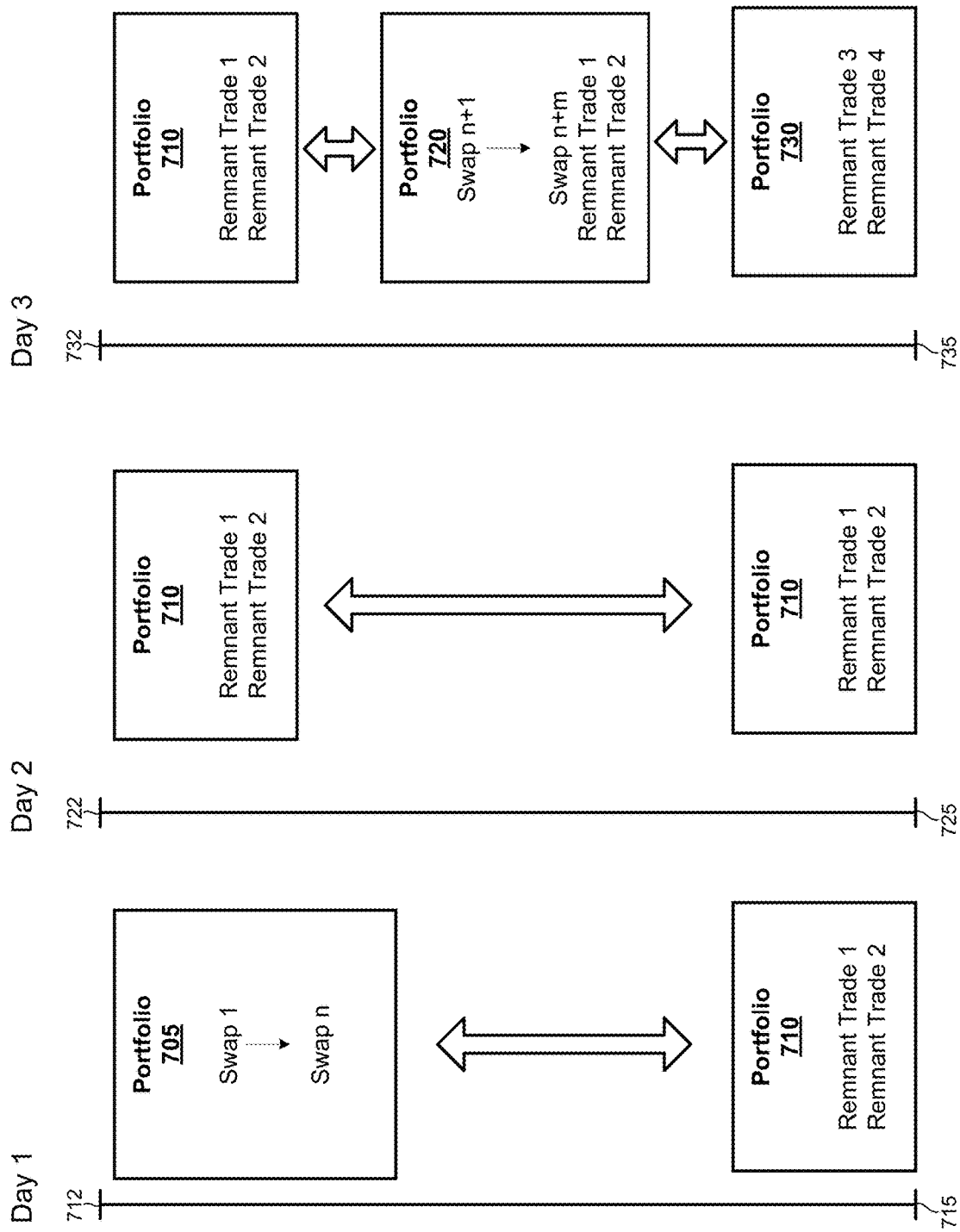
FIG. 7 shows an illustrative representation of portfolio compression over time in accordance with an aspect the invention.

FIG. 7 shows an illustrative representation of portfolio compression over time. For example, at the start 712 of Day 1 (e.g., calendar day, trading day, etc.), the portfolio 705 may include "n" swaps (e.g., swap 1, swap 2 . . . swap n), such as the swaps 610 of FIG. 6. At a specified time and/or in response to a compression request, the financial institution may desire to compress the swaps in the portfolio to determine a first compressed portfolio 710. For example, the first compressed portfolio may include a first remnant trade and a second remnant trade that result from compressing the swaps included in an uncompressed portfolio, such as the portfolio 705. In some cases, the compression of the portfolio 705 may occur automatically at the end 715 of Day 1. In some cases, the financial institution may automatically compress a portfolio at the end of a business day, at the end of a trading day, and/or the like. In other cases, the financial institution may compress a portfolio in response to a request for compression. This request may be received from one or more different sources, such as a request from a user and/or as a result of a rules-based decision. For example, a user may trigger a compression by sending a request to compress the portfolio. In some cases, a user may monitor and/or sample information associated with a portfolio, such as a number of swaps contained in the portfolio 705, the net notional 635, a net weighted notional 645, and the like. This information may be compared to a criterion to determine whether compression may be warranted. For example, the criterion may be associated with one or more of a maximum number of swaps to have in a portfolio, a maximum total notional value, a maximum total weighted notional value, and the like. If the criterion is met, then the portfolio 705 may be compressed. In the illustrative example, at the end of Day 1, the portfolio 705 is compressed to generate a second portfolio (e.g., the first compressed portfolio 710), where the second portfolio includes two trades, a first remnant trade and a second remnant trade. In some cases, the first remnant trade may be associated with the fixed rate components of the swaps 610 included in the portfolio 705 and the second remnant trade may be associated with the floating rate components of the swaps 610.

In an illustrative example, the portfolio 705 may include the swaps 610 at the start of Day 1. A compression request may be received from a user or may be otherwise initiated in response to a criterion having been met (e.g., a maximum number of swaps, a maximum notional value, etc.). Once initiated, the compression process may begin by calculating an interest rate associated with the plurality of the swaps 610, such as the simple average rate 625 using equation (1) above.

For example, the simple average rate 625 associated with the swaps 610 may be calculated to be 3.051040000. In some cases, the simple average rate may be rounded to a specified decimal precision, such as five decimal places, to determine the rounded average rate 627 (e.g., 3.05104). Also, the weighted notionals 640 associated with the swaps 610 may be calculated based on the rate and notional amount associated with each swap. For example, the weighted notional amount may be calculated using the equation (2) above, where the rate and the notional are associated with the same particular swap. For example, swap 1 has an interest rate of 3.1224 and a notional amount of −100,000,000. As such, the weighted notional amount may be determined to be −312,240,000. In some cases, the net weighted notional 645 amount may then be calculated for the portfolio 600 based by summing the weighted notionals 640, using the equation (3) above.

FIG. 8 shows an illustrative remnant trade, such as the first remnant trade 805 included in the first compressed portfolio 710 of FIG. 7. When determining the first and second remnant trades of the first compressed portfolio 710, the first remnant trade 805 may be derived such that cash flows 820 associated with the first remnant trade equals the total cash flows 830 of the swaps in the portfolio 705. For example, given the total cash flows 830 and the fixed rate 627, a notional 807 for the first remnant trade 805 may be determined by dividing the net weighted notional 645 by the fixed rate 627, such as by using the equation (5) above.

In some cases, the notional amounts may be rounded to 2 decimal places. For example, in this illustrative case, the notional amount of the first remnant trade may be calculated as 46,081,515/3.05104=$15,103,543.38. As such, the first remnant trade 805 may have an associated fixed rate of 3.05104 and a notional of $15,103,543.38.

FIG. 9 shows an illustrative remnant trade, such as the second remnant trade 905 for compressing the swaps of the portfolio 705 in FIG. 7. In some cases, the second remnant trade 905 may be determined to match the floating rate cash flows of the swaps 610 in the portfolio 705. For example, a sum of float payments associated with both the first remnant trade and the second remnant trade may be designed to match the cash flow of the swaps 610. In such cases, the notional 907 of the second remnant trade 905 may be calculated using the equation (6) above.

In the illustrative example, the notional 907 of the second remnant trade 905 may be calculated as the net notional 635 for the swaps 610 in the portfolio (e.g., $6,870,000) minus the notional 807 of the first remnant trade 805 (e.g., ($15,103,545.38). As such, the notional 907 of the second remnant trade 905 may be calculated to be $−8,233,548.38. As the fixed rate 627 chosen for the first remnant trade 805 fully accounts for the fixed rate components of the original trades, the rate associated with the second remnant trade 905 may be set to 0.

Returning to FIG. 7, at the start of Day 2, the first compressed portfolio 710 may include the first remnant trade and the second remnant trade. In some cases, such as illustrated for Day 2, no trades may be performed in association with the first compressed portfolio 710. As such, the first compressed portfolio 710 remains the same at the end 725 of Day 2 as at the start 722 of Day 2. Because of this, the trades included in the first compressed portfolio 710 do not undergo netting of different fixed rates or coupon blending because no further reduction in line items and/or net notional value is necessary.

At the start 732 of Day 3, in the illustrative example of FIG. 7, the first compressed portfolio 710 may remain the same as at the end of Day 2 and include the first remnant trade and the second remnant trade. In some cases, such as during Day 3, one or more trades may take place such that these additional trades may be associated with the portfolio, resulting in the portfolio 720. as shown in FIG. 10. For example, the portfolio 720 may include the swaps 1010 executed on Day 3 and the previously existing compressed swaps 1020 (e.g., the first remnant swap 805 and the second remnant swap 905).

At the end 737 of Day 3, the portfolio 720 may be compressed similarly to the compression performed on Day 1. For example, a simple average rate 1025 may be calculated using the rates associated with the swaps 1010, 1020 of the portfolio 720. Also, the net notional value 1035 may be calculated by summing the notional values of the swaps 1010, 1020, and a net weighted notional 1045 may be calculated by summing weighted notional amounts associated with each of the swaps 1010, 1020 of the portfolio 720. Because the second remnant swap 905 may be a zero coupon swap (e.g., have a rate set to 0), the simple average rate 1025 may be calculated without including this swap. For example, the simple average may only be calculated based on the swaps having non-zero rates.

FIG. 11 shows an illustrative third remnant trade 1105 that may be created during a compression of the swaps of the portfolio 720. For example, the third remnant trade 1105 may be derived such that cash flows 1120 associated with the first remnant trade equals the total cash flows 1130 of the swaps in the portfolio 720. For example, given the total cash flows 1130 and the fixed rate 1027, a notional 1107 for the third remnant trade 1105 may be determined by dividing the net weighted notional 1045 by the fixed rate 1027, as discussed above in reference to the first remnant trade. In some cases, the notional amounts may be rounded to 2 decimal places. For example, in this illustrative case, the notional amount of the third remnant trade may be calculated as 34,173,459.99/3.67091=$9,309,261.19. As such, the third remnant trade 1105 may have an associated fixed rate of 3.67091 and a notional of $9,309,261.19.

FIG. 12 shows an illustrative chart 1200 for calculating a fourth remnant trade (e.g., the fourth remnant trade 1205 of FIG. 13). In some cases, the fourth remnant trade 1205 may be determined to match the floating rate cash flows of the swaps in the portfolio 720. For example, a sum of float payments associated with both the first remnant trade and the second remnant trade may be designed to match the cash flow of the portfolio 720. In such cases, the notional 1207 of the fourth remnant trade 1205 may be calculated using the equation discussed above in reference to the second remnant trade. In the illustrative example, the notional 1207 of the fourth remnant trade 1205 may be calculated as the net notional 1035 for the portfolio 720 (e.g., $1,000,000) minus the notional 1107 of the third remnant trade 1105 (e.g., ($9,309,261.19). As such, the notional 1207 of the fourth remnant trade 1205 may be calculated to be $−8,309,261.19. As the fixed rate 1027 chosen for the third remnant trade 1105 fully accounts for the fixed cash flows of the original trades, the rate associated with the fourth remnant trade 1205 may be set to 0. As such, at the end 735 of Day 3, the portfolio 730 includes two remnant trades that have been created by compressing the swaps 1010, 1020 of the portfolio 720. For example, the portfolio 730 may include the third remnant trade 1105 having a notional of $9,309,261.19 with a rate of 3.67091 and the fourth remnant trade 1205 having a notional of $−8,309,261.19 with an associated rate of 0. As such, the seven trades included in the portfolio 720 are reduced to the two remnant trades of the portfolio 730, where the net notional amount associated with the portfolios 720, 730 have been reduced from $765,000,000 to under $18,000,000, where all other economic details of the two remnant trades of the portfolio 730 match the trades in the portfolio 720 and the first compressed portfolio 710.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims.

The invention claimed is:

1. A system comprising:
a non-transitory memory storing a plurality of data items, at least a portion of which are associated with different financial instruments and wherein each of the plurality of data items includes data indicative of first and second parameters thereof having, respectively, a first value and a second value, the plurality of data items being further collectively characterized by first and second characteristics based on the first and second values of each of the plurality of data items;
a computing device including a processor coupled with the non-transitory memory and configured to:
determine, periodically, when the plurality of data items currently stored in the non-transitory memory meets a threshold and, based thereon generate:
a first replacement data item based the first values associated with each of the plurality of data items such that a first characteristic of the first replacement data item is identical to the first characteristic of the plurality of data items; and
a second replacement data item based on the second values associated with each of the plurality of data items and the first replacement data item such that a second characteristic of the second replacement data item is identical to the second characteristic of the plurality of data items;
wherein the first and second replacement data items are collectively characterized by a third characteristic and a fourth characteristic as a result of the first and second characteristics of the first and second data items, the third characteristic being identical to the first characteristic of the plurality of data items and the fourth characteristic being identical to the second characteristic of the plurality of data items; and replace all of the data items of the plurality of data items with the first and second replacement data items in the non-transitory memory, wherein an amount of data stored in the non-transitory memory is reduced thereby.

2. The system of claim 1, wherein the threshold comprises one of a maximum number of instruments included in a portfolio, a maximum total notional value, or a maximum total weighted notional value.

3. The system of claim 1, wherein the threshold comprises a maximum number of instruments to have in a portfolio, the computing device being further configured to monitor a size of the plurality of data items by comparing the count of the plurality of data items stored therein to the threshold.

4. The system of claim 1, wherein the computing device is further configured to process the plurality of data items, prior to the determination that the plurality of data items meets the threshold, to net together any of the plurality of data items having characteristic data indicative of a same first value such that all remaining of the plurality of data items have characteristic data indicative of a different first value.

5. The system of claim 4, wherein the processing of the plurality of data items, prior to the determination that the plurality of data items meets the threshold, further comprises sending a message to a trader associated with the plurality of data items identifying those data items of the plurality of lines items which may be netted.

6. The system of claim 4, wherein the processing of the plurality of data items, prior to the determination that the plurality of data items meets the threshold, is performed daily.

7. The system of claim 1, wherein a total notional associated with the first and second replacement data items is less than a total notional associated with the plurality of data items.

8. A computer implemented method comprising:

storing, in a non-transitory memory storing a plurality of data items, at least a portion of which are associated with different financial instruments and wherein each of the plurality of data items includes data indicative of first and second parameters thereof having, respectively, a first value and a second value, the plurality of data items being further collectively characterized by first and second characteristics based on the first and second values of each of the plurality of data items;

determining, periodically by a processor coupled with the non-transitory memory, when the plurality of data items currently stored in the non-transitory memory meets a threshold and, based thereon generate:

a first replacement data item based the first values associated with each of the plurality of data items such that a first characteristic of the first replacement data item is identical to the first characteristic of the plurality of data items; and a second replacement data item based on the second values associated with each of the plurality of data items and the first replacement data item such that a second characteristic of the second replacement data item is identical to the second characteristic of the plurality of data items;

wherein the first and second replacement data items are collectively characterized by a third characteristic and a fourth characteristic as a result of the first and second characteristics of the first and second data items, the third characteristic being identical to the first characteristic of the plurality of data items and the fourth characteristic being identical to the second characteristic of the plurality of data items; and replacing, by the processor, all of the data items of the plurality of data items with the first and second replacement data items in the non-transitory memory, wherein an amount of data stored in the non-transitory memory is reduced thereby.

9. The computer implemented method of claim 8, wherein the threshold comprises one of a maximum number of instruments included in a portfolio, a maximum total notional value, or a maximum total weighted notional value.

10. The computer implemented method of claim 8, wherein the threshold comprises a maximum number of instruments to have in a portfolio, the computing device being further configured to monitor a size of the plurality of data items by comparing the count of the plurality of data items stored therein to the threshold.

11. The computer implemented method of claim 8, wherein the computing device is further configured to process the plurality of data items, prior to the determination that the plurality of data items meets the threshold, to net together any of the plurality of data items having characteristic data indicative of a same first value such that all remaining of the plurality of data items have characteristic data indicative of a different first value.

12. The computer implemented method of claim 11, wherein the processing of the plurality of data items, prior to the determination that the plurality of data items meets the threshold, further comprises sending a message to a trader associated with the plurality of data items identifying those data items of the plurality of lines items which may be netted.

13. The computer implemented method of claim 11, wherein the processing of the plurality of data items, prior to the determination that the plurality of data items meets the threshold, is performed daily.

14. The computer implemented method of claim 8, wherein a total notional associated with the first and second replacement data items is less than a total notional associated with the plurality of data items.

15. A system comprising a processor and a non-transitory memory coupled therewith, the system further comprising instructions stored in the non-transitory memory and configured to, when executed by the processor, cause the processor to:

store, in a non-transitory memory, a plurality of data items, at least a portion of which are associated with different financial instruments and wherein each of the plurality of data items includes data indicative of first and second parameters thereof having, respectively, a first value and a second value, the plurality of data items being further collectively characterized by first and second characteristics based on the first and second values of each of the plurality of data items;

determine, periodically, when the plurality of data items currently stored in the non-transitory memory meets a threshold and, based thereon generate:

a first replacement data item based the first values associated with each of the plurality of data items such that a first characteristic of the first replacement data item is identical to the first characteristic of the plurality of data items; and a second replacement data item based on the second values associated with each of the plurality of data items and the first replacement data item such that a second characteristic of the second replacement data item is identical to the second characteristic of the plurality of data items;

wherein the first and second replacement data items are collectively characterized by a third characteristic and a fourth characteristic as a result of the first and second characteristics of the first and second data items, the third characteristic being identical to the first characteristic of the plurality of data items and the fourth characteristic being identical to the second characteristic of the plurality of data items; and replace all of the data items of the plurality of data items with the first and second replacement data items in the non-transitory memory, wherein an amount of data stored in the non-transitory memory is reduced thereby.

16. The system of claim 15, wherein the threshold comprises one of a maximum number of instruments included in a portfolio, a maximum total notional value, or a maximum total weighted notional value.

17. The system of claim 15, wherein the threshold comprises a maximum number of instruments to have in a portfolio, the computing device being further configured to monitor a size of the plurality of data items by comparing the count of the plurality of data items stored therein to the threshold.

18. The system of claim 15, wherein the computing device is further configured to process the plurality of data items, prior to the determination that the plurality of data items meets the threshold, to net together any of the plurality of data items having characteristic data indicative of a same first value such that all remaining of the plurality of data items have characteristic data indicative of a different first value.

19. The system of claim 18, wherein the processing of the plurality of data items, prior to the determination that the plurality of data items meets the threshold, further comprises sending a message to a trader associated with the plurality of data items identifying those data items of the plurality of lines items which may be netted.

20. The system of claim 18, wherein the processing of the plurality of data items, prior to the determination that the plurality of data items meets the threshold, is performed daily.

21. The system of claim 15, wherein a total notional associated with the first and second replacement data items is less than a total notional associated with the plurality of data items.

* * * * *